United States Patent
Paraszczak et al.

(10) Patent No.: US 10,273,363 B2
(45) Date of Patent: *Apr. 30, 2019

(54) CASTING WAX

(71) Applicant: Remet Corporation, Utica, NY (US)

(72) Inventors: John Stanley Paraszczak, Utica, NY (US); Randolph Eugene Morss, Utica, NY (US); Grant Bradley, Rochester (GB)

(73) Assignee: REMET CORPORATION, Utica, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/852,264

(22) Filed: Dec. 22, 2017

(65) Prior Publication Data

US 2018/0171145 A1 Jun. 21, 2018

Related U.S. Application Data

(63) Continuation of application No. 15/036,015.

(30) Foreign Application Priority Data

Sep. 30, 2013 (GB) .................................. 1317300.0

(51) Int. Cl.
*C08L 91/06* (2006.01)
*C08L 57/02* (2006.01)
*C08L 91/08* (2006.01)

(52) U.S. Cl.
CPC .............. *C08L 91/06* (2013.01); *C08L 57/02* (2013.01); *C08L 91/08* (2013.01); *C08L 2205/025* (2013.01)

(58) Field of Classification Search
CPC .................................. C08L 91/06; C08L 91/08
USPC ............................................... 208/20, 21, 24
See application file for complete search history.

(56) References Cited

U.S. PATENT DOCUMENTS

| | | |
|---|---|---|
| 3,554,949 A | 1/1971 | Burke |
| 3,717,485 A | 2/1973 | Larson |
| 3,880,790 A | 4/1975 | McLaren et al. |
| 4,758,613 A | 7/1988 | Kawano et al. |
| 5,205,969 A | 4/1993 | Nett, Jr. et al. |
| 5,518,537 A | 5/1996 | Muschio, III |
| 6,231,656 B1 | 5/2001 | Dekerf et al. |

(Continued)

FOREIGN PATENT DOCUMENTS

| | | |
|---|---|---|
| CN | 1765994 A | 5/2006 |
| CN | 101074320 A | 11/2007 |

(Continued)

OTHER PUBLICATIONS

Examination report for Australian Patent Application No. 2014326664 dated Jan. 17, 2017 (3 pages).

(Continued)

*Primary Examiner* — Ellen M McAvoy
(74) *Attorney, Agent, or Firm* — Smith, Gambrell & Russell, LLP

(57) ABSTRACT

A blended wax for lost wax casting comprises a blend of three or more paraffinic or similarly petrochemically derived wax cuts. Preferably each of the three or more wax cuts have a different melting point, the melting point of each wax cut differing from the melting point of another wax cut by between 3 and 6 deg. C.

23 Claims, 3 Drawing Sheets

(56) References Cited

U.S. PATENT DOCUMENTS

| | | | |
|---|---|---|---|
| 6,262,153 B1 | 7/2001 | Webster et al. | |
| 6,326,429 B1 | 12/2001 | Sturgis et al. | |
| 6,984,680 B2 | 1/2006 | Quinn | |
| 7,445,648 B2 | 11/2008 | Hudson et al. | |
| 7,479,216 B2* | 1/2009 | Dieckmann | C10L 1/32 137/13 |
| 7,866,371 B2 | 1/2011 | Hasselberg et al. | |
| 8,974,880 B2 | 3/2015 | Schneider et al. | |
| 2005/0086853 A1 | 4/2005 | Hudson et al. | |
| 2007/0131580 A1* | 6/2007 | Patel | C08F 6/04 208/20 |
| 2009/0197105 A1* | 8/2009 | Buchholz | B27N 1/006 428/473.5 |
| 2010/0288194 A1 | 11/2010 | Stockwell et al. | |
| 2012/0216722 A1* | 8/2012 | Stuart | C04B 28/14 106/778 |
| 2013/0209709 A1 | 8/2013 | Schneider et al. | |
| 2014/0046102 A1* | 2/2014 | D'Amato | C08J 11/00 585/17 |
| 2014/0179846 A1* | 6/2014 | Lake, Jr. | C08J 3/203 524/400 |
| 2016/0015496 A1* | 1/2016 | Johnson | C08L 91/08 433/80 |

FOREIGN PATENT DOCUMENTS

| | | |
|---|---|---|
| CN | 102876054 A | 1/2013 |
| SU | 422163 | 3/1974 |
| WO | 2005/042682 A1 | 5/2005 |
| WO | 2012/048672 A1 | 4/2012 |

OTHER PUBLICATIONS

Chinese Office Action dated Aug. 4, 2017 for CN 201480059930.2 (12 pages in Chinese with English translation).
International Search Report for PCT/EP2014/070666 dated Dec. 2, 2014. (3 pages).
Written Opinion of the International Search Authority for PCT/EP2014/070666 dated Dec. 2, 2014 (5 Pages).
International Preliminary Report on Patentability Chapter II for PCT/EP2014/070666 dated Dec. 9, 2015 (26 pages).
Russian Search Report dated May 15, 2018 relative to RU 2016114417.

* cited by examiner

CASTING WAX

BACKGROUND OF INVENTION

The control of dimensional change (shrinkage) in blended waxes employed for lost wax casting, also known in the art as investment casting, has traditionally been achieved by the addition of inert, low ash organic fillers to reduce the volume of the formulation subjected to shrinkage. The remainder of the formulation comprises a small number of waxy components, compatible resins, additives and dyes.

It has now been discovered that similar results can be achieved with a lower level of filler, or in some applications without filler, by careful blending of several individual "cuts" of crystalline wax components to achieve control of the dimensional change by influencing the extent, crystal size and type of crystallisation occurring when the "cuts" solidify.

PRIOR ART

U.S. Pat. No. 3,554,949 (Burke) describes meltable solid waxes combined with rigid, non-meltable, non-soluble cross-linked, colloidal-sized, vinylic filler particles which provide improved physical properties such as increased hardness and strength.

U.S. Pat. No. 5,518,537 (Muschio) describes fillers for investment waxes comprising thermoplastic cellulosic acetate resin powders.

U.S. Pat. No. 6,326,429 (Sturgis et al) describes wax compositions that include polymeric organic carbonate fillers. These fillers reduce shrinkage and also reduce emission of volatile organic compounds during the forming and melting processes which occur during casting.

DESCRIPTION OF INVENTION

Figure 1:
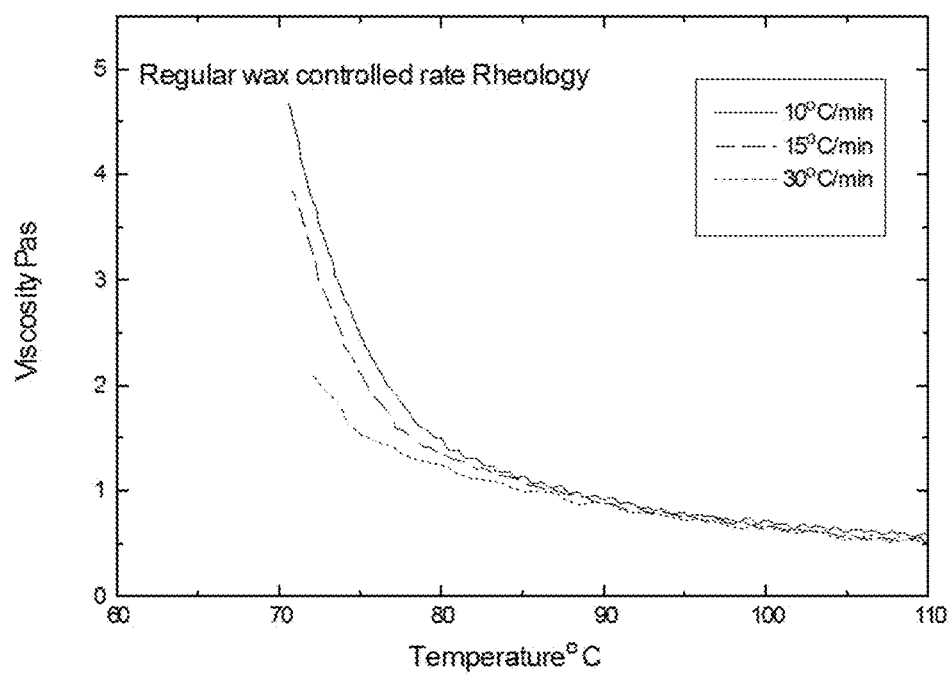
FIG. 1 shows rheology curves at different cooling rates for regular casting wax.

The so-called "lost-wax" process has been employed for the manufacture of castings for thousands of years. Essentially, this process comprises forming a pattern of wax or blends of various suitable waxes and resins and making a metal copy therefrom. Commonly, the wax pattern is produced by injecting hot liquid or paste wax into a re-usable die. The injection process takes place via either a tank-loaded hydraulically driven injection piston and nozzle or by a hopper of solid wax pastilles, a screw thread loaded piston and nozzle combination.

The operator or process owner has a degree of control over the injection equipment such that factors including: temperature of stored wax, temperature of wax to be injected, temperature of nozzle, wax pressure and rate of flow can be optimised to get the best performance out of the wax used.

After injection the pattern is allowed sufficient time to cool to a state where it can be handled before being removed from the die.

This finished pattern is then invested with a suitable medium, such as a ceramic or refractory slurry, which is then solidified and becomes a mold around the wax pattern. The pattern material or more commonly the wax is then removed from the mold by melting it and/or by burning, and a molten metal is poured into the now empty mold to produce the finished part.

The petrochemically derived waxes commonly used in the lost wax casting process, have been noted for many years as being subject to shrinkage, inherent in the change in molar volume going from a liquid wax to a solid crystalline material.

Paraffin waxes in particular, have both an initial crystallisation shrinkage and a subsequent shrinkage induced by a shift in crystal structure.

Polar materials such as urea have been used to make casting moulds without inherent shrinkage but have many disadvantages.

Thus the lost wax casting industry has employed organic fillers as shrinkage neutral components within blended wax formulations to mitigate the effects of the dimensional change associated with the shrinkage of crystalline wax components when they change phase from liquid to solid.

All of the employed types of filler have their own advantages and disadvantages in performance, behaviour and cost. In the last few years, with the instability of oil prices and the raw materials used to make fillers, the cost of filler has become an increasing burden. Furthermore, if fillers are included within the wax composition, the wax composition must be safe to handle as a solid and must be capable of convenient melting or burning out of a mold. It is also highly preferred that the wax composition have a low ash content; that is, less than about 0.1%, preferably about 0.02% by weight or less when burned. It is also necessary that such wax compositions be of sufficient strength and be hard enough at room temperature, so that the patterns be self-supporting and can be handled without damage.

The present invention comprises a method of reducing the inherent shrinkage of a petrochemical wax blend and the need to employ traditional fillers by careful selection of number and nature of the wax cuts used in the blend.

According to the present invention, there is provided a blended wax for lost wax casting in accordance with embodiments of the present invention.

According to the present invention, there is provided a blended wax for lost wax casting comprising a blend of three or more paraffinic or similarly petrochemically derived wax cuts.

Preferably, each of the three or more wax cuts have a different melting point and wherein the melting point of each wax cut differs from the melting point of another wax cut by between 3-6° C.

Preferably, the three or more wax cuts are formulated wherein the ratio of one wax cut relative to another wax cut is between 1:1 and 11:1.

In one embodiment, the blended wax comprises a blend of four paraffinic or similarly petrochemically derived wax cuts. In this embodiment, the first wax cut preferably comprises a melting point in the range 48-50° C., the second wax preferably cut comprises a melting point in the range 54-57° C., the third wax cut preferably comprises a melting point in the range 60-62° C. and the fourth wax cut preferably comprises a melting point in the range 65-68° C.

Preferably, the blended wax comprises one or more organic resins. The one or more organic resins may be selected from the group comprising: Rosin, Rosin derivatives, Rosin esters.

Preferably, the blended wax comprises one or more polymers. More preferably, the one or more polymers comprises hydrocarbon polymers.

The blended wax may further comprise one or more inert organic fillers. The one or more organic fillers may be selected from the group comprising: high melting point organic acids, polyols, cross-linked polymers of unsaturated monomers, cellulose derivatives, polyester resins, cross-linked or straight chain polycarbonate resins and bis-phenol derivatives.

Preferably, the blend of three or more wax cuts makes up 15-40% by weight of the total blended wax.

The blended wax may further comprise 1-16% microwax, 0-5% natural and/or synthetic waxes, 20-50% resinous material, 0-5% polymers and 0-30% fillers by weight of the total blended wax. Preferably, the fillers comprise 20% or less by weight of the total blended wax.

The approach permits a substantial reduction in the amount of filler required to achieve a given shrinkage and thus reduces the disadvantages of using filler in the blended wax.

Paraffins and other petrochemically derived waxes are supplied as "cuts", or "grades", typified by softening point and containing a spread of individual compounds of differing alkyl chain lengths, structures and molecular weights.

Formulators skilled in the art often select a particular melting point cut of paraffin wax to achieve the required melting point and hardness characteristics and furthermore it has been known to blend two cuts to achieve intermediate melting points or for melting point control when the waxes are blended with resins with variable properties.

The applicants have found that by formulating a blended wax using a wider spread of paraffinic or similar petrochemically derived wax "cuts" rather than one particular "cut", the prevalence of any particular individual compound or cut within the formulation is reduced.

Applicants have found that wax blends with a range of melting points can be achieved by blend formulation with three or more "cuts" (see table 1).

TABLE 1

| Blend Designation | Blend Ratios | | | | | Drop Melt Point (° C.) |
|---|---|---|---|---|---|---|
| | Paraffin Cut 1 | Paraffin Cut 2 | Paraffin Cut 3 | Paraffin Cut 4 | Paraffin Cut 5 | |
| A | 0 | 0 | 1 | 0 | 0 | 59.5 |
| B | 1 | 1 | 1 | 1 | 1 | 62.9 |
| C | 0 | 1 | 1 | 1 | 0 | 59.5 |
| D | 1 | 4 | 6 | 4 | 1 | 60.8 |
| E | 3 | 3 | 1 | 3 | 3 | 63.9 |
| F | 6 | 3 | 1 | 3 | 6 | 65.0 |
| G | 3 | 0 | 1 | 0 | 3 | 66.0 |
| H | 1 | 0 | 6 | 0 | 1 | 64.5 |

Blend A is the reference sample of a single wax grade. Blends B-H are composed of various blend ratios. Cut 1 has a melting point around 52-54° C., Cut 5 has a melting point of 66-69° C.

Note that a range from the single middle cut of wax (3) melting point of 59.5° C. through to a melting point equivalent to a traditional blend composed of a 50:50 ratio of cut 1 and cut 5 can be achieved by using three and five component blends.

Note also that the blends here are all symmetrical around the reference "Cut 3", and the above results demonstrate that the blends are not necessarily behaving quite in accordance with the law of mixtures (the most common rule of thumb used by those skilled in the art when formulating a blended wax).

When the molten wax blend is cooled from the liquid state, the point at which crystals are formed, and the size and morphology of the crystals is influenced by the concentrations of the individual waxy compounds within the formulation.

This can be seen reflected in the solidification enthalpy extracted from cooling Differential Scanning calorimetry (DSC) traces for the wax blends (see table 2). DSC is a preferred technique for ascertaining the thermal behaviour of wax mixtures.

Most of the dimensional change within a casting wax is attributable to the transition of liquid components to a crystalline form, a process directly measurable from the enthalpy of crystallisation ($\Delta H$).

TABLE 2

| | Blend Designation | | | | | | | |
|---|---|---|---|---|---|---|---|---|
| | A | B | C | D | E | F | G | H |
| $\Delta H$ J/g | 267.9 | 187.9 | 185.1 | 173.2 | 188.7 | 185.3 | 175.7 | 206.2 |

As the crystallisation enthalpy for a given molecule type crystallising into a particular form is fairly fixed and any residual amorphous components also exhibit low variation in solidification enthalpy, the recorded variation above is almost entirely due to the reduction in overall crystallisation stemming from the blending of the various wax cuts.

In accordance then with the expected behaviour for organic compounds, a wide spread of individual molecules of varying structure lowers the temperature at which crystals form, and modifies the amount, the type and the eventual size of any particular crystal formed, which is reflected within the solidification enthalpy.

According to the present invention, there is provided a blended wax for lost wax casting where the shrinkage of the wax on cooling from a molten or paste state can be controlled by blending of a wide spread of wax "cuts".

Cooling either a liquid wax formulated in this fashion, or the paste wax from a similar formulation results in less dimensional change than a wax formulated from a single, or limited selection of "cuts" of wax.

A surprising effect of the multi-cut approach described herein is that where crystallisation is reduced in temperature by the formulation, both the wax liquidity temperature and the temperature at which a workable paste is formed are reduced.

Figure 2:
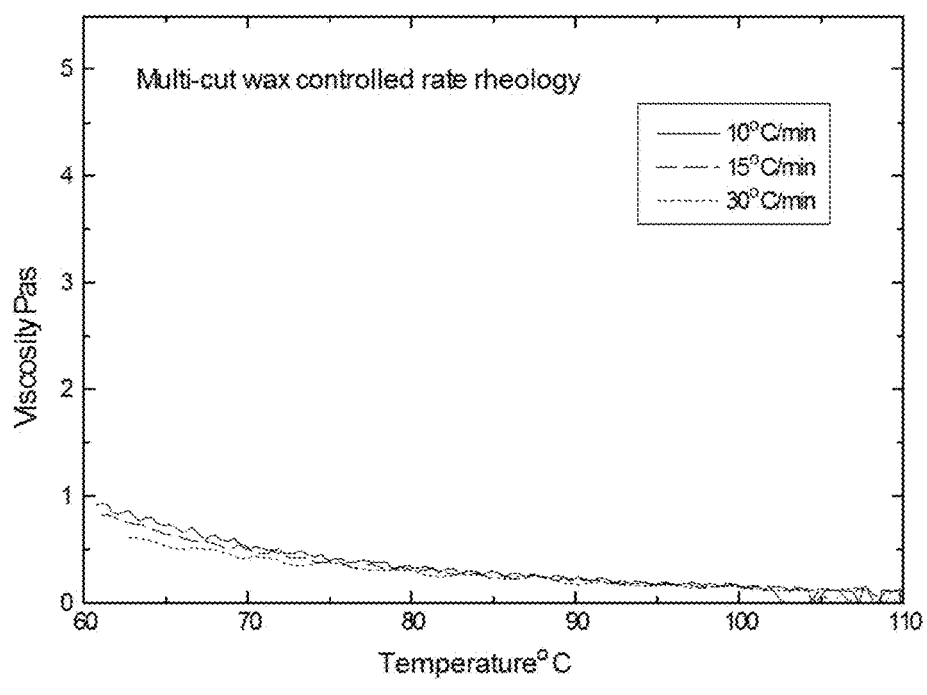
FIG. 2 shows rheology curves at different cooling rates for multi-cut wax.

FIGS. 1 and 2 show the rheology curves at different cooling rates for regular casting wax and the multi-cut wax respectively.

Note that the degree of hysteresis between heating and cooling behaviour means that the reduction in crystallinity does not have any effect on the heat stability of formed patterns. (See Melting point data in Table 1 above)

For the experienced injection press operator, this unexpected advantage further contributes to reduction of shrinkage in the wax patterns, as the operator can work their press at a lower injection temperature for a given wax flow.

The ability to reduce the amount of solid fillers used is also contributory to wax liquidity, and consequently to reducing shrinkage by injecting at lower temperatures is also an advantage.

A second surprising effect of the multi-cut approach is that by injecting these lower solidification enthalpy formulations at lower temperatures, relatively large parts of the casting wax have much less heat to lose before solidification, resulting in a faster cycle time. Field trials have demonstrated this across a variety of production parts (table 3):

TABLE 3

| Part Number | Cycle time regular wax | Cycle time multi-cut wax |
| --- | --- | --- |
| One | 100 s | 60 s |
| Two | 130 s | 70 s |
| Three | 75 s | 50 s |
| Four | 160 s | 90 s |

The test parts in table 3 were selected as complex to inject with regular wax or to remove form a mould and are as follows:

Part One—A 30×30×5 cm open square panel
Part Two—A 25×20×30 cm solid Caliper (with wax chills)
Part Three—Similar to part Two
Part Four—A 22×15×5 solid 12.5 mm thick U Section, with constraint across the top of the "U".

In formulating a blended wax of this type, one might begin with a mixture comprising 3-7 different paraffin wax cuts (preferably at least 4), each selected as having a 3-6° C. separation in melting point, preferably a 4-6° C. separation in melting point, and formulated at ratios between 1:1 and 11:1, preferably between 1:1 and 10:1.

It is important that wax "cuts" are supplied as direct refinery products so that each "cut" represents a distinct range of molecules and will cleanly exhibit the effects of the multi-cut wax blends described herein.

Traditionally, "cuts" offered in the open market are formulated by the supplying wax blender, thus there is no advantage in specifying use of a particular spread of cuts as the supplied "cuts" may be themselves composite blends.

The multi-cut blends as herein described may be used as 15-40% of a blended casting wax formulation which may also contain 1-16% micro-waxes, 0-5% natural and/or synthetic waxes, 20-50% paraffin compatible resinous materials, 0-5% additive polymers, 0-30% fillers, preferably 20% or less, and may further comprise dyes or pigments to colour the wax.

Micro-waxes are a type of wax produced by de-oiling petrolatum, as part of the petroleum refining process. In contrast to paraffin wax which contains mostly unbranched alkanes, micro-wax contains a higher percentage of isoparaffinic (branched) hydrocarbons and naphthenic hydrocarbons. It is characterized by the fineness of its crystals in contrast to the larger crystal of paraffin wax. It consists of high molecular weight saturated aliphatic hydrocarbons and has a higher molecular weight and melting point. The elastic and adhesive characteristics of microcrystalline waxes are related to the non-straight chain components which they contain. Typical microcrystalline wax crystal structure is small and thin, making them more flexible than paraffin wax.

Micro-waxes have long been used to moderate phase separation of paraffin waxes, but evidence from the investment casting industry suggests that they do not affect the extent of the crystallisation (i.e. the shrinkage) but only the size of the crystals.

DSC experiments have shown an even increase of around 15 J/g for all wax/resin blends tested with microwax additions. This increase in solidification enthalpy is offset by a reduction in the completion temperature of the crystallisation process to below room temperature, implying that the use of microwax will not increase overall crystallinity at room temperature. Thus they can enhance flexibility without compromising the restriction of crystallinity.

In order to harden the casting wax for application of the ceramic mold, and to prevent damage to the wax model, naturally derived candelilla or similar wax may be added to the formulation. Candellila wax consists of mainly hydrocarbons (about 50%, chains with 29-33 carbons), esters of higher molecular weight (20-29%), free acids (7-9%), and resins (12-14%, mainly triterpenoid esters).

Additives such as branched polyolefins may be added to the formulation. Such additives are potentially capable of retarding syneresis (liquid/gel phase separation), and further controlling phase separation. Care must be taken to ensure that these additives are not used at levels where the crystallisation inherent within these products also eliminates the desired reduction in shrinkage!

Further DSC experiments have demonstrated that branched polyolefin additives can be introduced at levels up to 7.5% without compromising the crystallisation effect derived from the multi-cut approach.

As an example, Wax Blend A (Pure Cut 3)—see table 1—formulated with such an additive and a C5 resin (see below) exhibited a solidification enthalpy of 87.5 J/g. Wax Blend B (even blend of 5 paraffin cuts), formulated in a similar fashion, exhibited a solidification enthalpy of 52.7 J/g C5 Hydrocarbon resins may also be added to the formulation.

The choice of resins is critical. In the melt, resins can behave as the solvents from which the crystals of wax emerge. Even if the choice of wax is perfectly correct to exhibit the effects described here, incorrect choice of resin can undo the effect (table 4):

TABLE 4

| Wax Blend Designation | Solidification Enthalpy (Good Resin) ΔH J/g | Solidification Enthalpy (Bad Resin) ΔH J/g | Solidification Enthalpy (Mixed Resins) ΔH J/g |
| --- | --- | --- | --- |
| A | 64.88 | 79.92 | 88.64 |
| B | 61.34 | 84.23 | 69.47 |
| C | 65.77 | 81.20 | 127.05 |
| D | 62.17 | 87.34 | 87.72 |
| E | 59.97 | 88.29 | 126.38 |
| F | 66.18 | 83.28 | 62.54 |
| G | 59.35 | 90.39 | 70.56 |
| H | 62.20 | 86.19 | 82.30 |

Table 5 shows that there is clearly a difference between a wax blend with an addition of good resin compared to bad, and also shows that when good and bad resins are blended, the results are difficult to predict, and non-intuitive. Note that whether a resin is "good" or "bad" can only be assessed by scrutinising the performance in conjunction with preferred wax blends by DSC.

Reclaim wax might also be included as part of the formulation, with the level being determined by the quality and origin of the reclaimed material.

With a reclaim blend from regular waxes, the level of reclaim wax that can be tolerated will be limited by the composition of the reclaim product. Reclaim derived from the multi-cut wax blend described herein will be tolerable at a far higher level than wax which is derived from other waxes using a smaller number of cuts.

Thus a wide range of formulation components can be carefully used without destroying the multi-cut effect, although verification of the effect by DSC and/or rheology should be used as a formulation tool.

From this understanding blended waxes with a wide range of melting point, hardness, elasticity etc. can be formulated such that they exhibit the advantages of the multi-cut approach.

EXAMPLES

An investment casting wax was made by blending a range of the components, in particular a range of different cuts of paraffin waxes all having different melting point ranges.

Formulation of Example Waxes

| EXAMPLE 1 | | EXAMPLE 2 | |
|---|---|---|---|
| 1.5% | 48-50° C. Paraffin Wax | 1.0% | 120 F. Paraffin Wax |
| 7.0% | 54-57° C. Paraffin Wax | 4.0% | 130 F. Paraffin Wax |
| 11.0% | 60-62° C. Paraffin Wax | 8.0% | 140 F. Paraffin Wax |
| 7.5% | 65-68° C. Paraffin Wax | 11.0% | 150 F. Paraffin Wax |
| 6.5% | Micro-Wax 1 | 6.0% | Micro-Wax 4 |
| 9.5% | Micro-Wax 2 | 3.0% | Micro-Wax 5 |
| 1% | Candelilla Wax | 1.5% | Candelilla Wax |
| 5% | Polyolefin 1 | 4.5% | Polyolefin 1 |
| 30% | C5 Resin 1 | 35.0% | C5 Resin 3 |
| 19% | C5 Resin 2 | 14.0% | C5 Resin 4 |
| 2.0% | Reclaim Wax | 2.0% | Reclaim Wax |
| | | 10% | Micro-Wax 6 |

Wherein:

Micro Wax 1: Cong. 71-76° C., Visc(99° C.) 11-14 cSt, Pen 25° C. 20-28 dmm, Pen 43.4° C. 70-150 dmm (esso).

Micro-Wax 2: Cong. 72-77° C., Visc(99° C.) 12-15 cSt, Pen 25° C. 8-16 dmm (ASTM), Pen 43.4° C. 25-35 dmm (ASTM).

Polyolefin 1: Melt 68.5-77° C., Visc(99° C.) 260-390 cps, Pen 25° C. 3-7 dmm (ASTM), Colour 2.0 Max, (ASTM D1500)

C5 Resin 1: Soft. Pt. (R&B) 96-104, AV(Max) 1.0 mgKOH/g Melt Visc.:<250 mPas@200° C., Mz 2800

C5 Resin 2: Soft. Pt. (R&B) 97-103, AV(Max) 1.0 mgKOH/g Melt Visc (BF).:7000 cps@140° C., Mz 6400, Mw 2400, Mn 750, $T_g$ 50° C.

Micro Wax 4: Dp Melt. 74-81° C., Visc(99° C.) 13.8-17.25 cSt, Pen 25° C. 20-30 dmm (ASTM)

Micro-Wax 5: Dp Melt.>89, Visc(99° C.)>16.5 cSt, Pen 25° C.<10 dmm (ASTM)

C5 Resin 3: Soft. Pt. 100° C., AV 0.48 mgKOH/g Iodine Value 80-120, Gardner colour 3

C5 resin 4: Soft. Pt. 97-103° C. Visc (melt) 1300 mPas@160° C., Mw 2100, Mn 1300, $T_{g\ 53}$ Micro-Wax 6: Cong. 77° C., Visc(99° C.) 12.55 cSt, Pen 25° C. 13 dmm (IP), Pen 43.4° C. 37 dmm (IP)

| | |
|---|---|
| Cong. | Congealing Point |
| Visc | Viscosity |
| Pen | Needle penetration |
| Soft. Pt. (R&B) | Ring and Ball softening point |
| AV | Acid Value |
| Dp Melt. | Drop melting point |
| Mz | z- average molecular weight |
| Mw | Weight average molecular weight |
| Mn | Number average molecular weight. |
| $T_g$ | Glass transition temperature |

Figure 3:
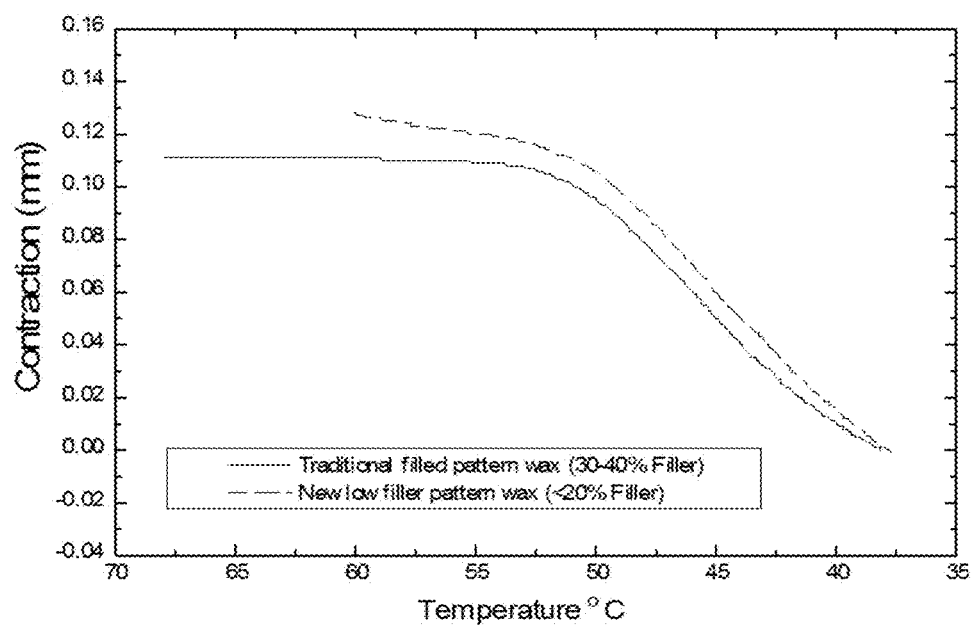
FIG. 3 shows a comparison of shrinkage between a higher filler level wax and a lower level filler wax.

The formulation of Example 1 was then tested to ascertain shrinkage in comparison to a traditional investment wax having a high filler level. The comparison is shown in FIG. 3. The contraction of the waxes from softening point downwards was measured as free contraction by Dynamic Mechanical Analysis (DMA) of a 9 mm sample.

The invention claimed is:

1. A blended wax comprising a plurality of paraffinic or petrochemically derived wax grades, wherein the plurality of wax grades comprises at least a first wax grade having a first melting point, a second wax grade having a second melting point that differs from the first melting point by 3-6° C., and a third wax grade having a third melting point that differs from the second melting point by 3-6° C., wherein fillers comprise 20 percent or less by weight of the total blended wax.

2. The blended wax of claim 1, wherein the plurality of wax grades comprises 15 to 40 percent by weight of the total blended wax.

3. The blended wax of claim 1, wherein the blended wax has an enthalpy of crystallization that ranges from 173.2 J/g to 206.2 J/g.

4. The blended wax of claim 1, wherein the second melting point differs from the first melting point by 4-6° C. and the third melting point differs from the second melting point by 4-6° C.

5. The blended wax of claim 1, wherein the plurality of wax grades are formulated wherein the ratio of each wax grade relative to another wax grade is between 1:1 and 11:1.

6. The blended wax of claim 1, wherein the plurality of wax grades further comprises a fourth wax grade having a fourth melting point.

7. The blended wax of claim 6, wherein the fourth melting point differs from the third melting point by 3-6° C.

8. The blended wax of claim 7, wherein the fourth melting point differs from the third melting point by 4-6° C.

9. A wax blend comprising:
a plurality of paraffinic wax grades, wherein the plurality of wax grades comprises at least a first wax grade having a first melting point, a second wax grade having a second melting point that differs from the first melting point by 3-6° C., and a third wax grade having a third melting point that differs from the second melting point by 3-6° C.;
at least one micro-wax present in an amount of 1 to 16 percent by weight of the wax blend; and
at least one resinous material present in an amount of 20 to 50 percent of by weight of the wax blend.

10. The wax blend of claim 9, wherein fillers comprise 20 percent or less by weight of the wax blend.

11. The wax blend of claim 9, further comprising one or more polymers.

12. The wax blend of claim 9, wherein the at least one resinous material is a C5 hydrocarbon.

13. The wax blend of claim 12, wherein the at least one resinous material comprises a first C5 hydrocarbon and a second C5 hydrocarbon.

14. The wax blend of claim 9, wherein the plurality of wax grades comprises 15 to 40 percent by weight of the wax blend.

15. A wax blend comprising:
a plurality of paraffinic wax grades, wherein the plurality of wax grades comprises at least a first wax grade having a first melting point, a second wax grade having a second melting point that is greater than the first melting point by 3-6° C., a third wax grade having a third melting point that is greater than the second melting point by 3-6° C., and a fourth wax grade having a fourth melting point that is greater than the third melting point by 3-6° C., wherein fillers comprise 20 percent or less by weight of the wax blend.

16. The wax blend of claim 15, further comprising at least one micro-wax present in an amount of 1 to 16 percent by weight of the wax blend.

17. The wax blend of claim 15, further comprising at least one resinous material present in an amount of 20 to 50 percent of by weight of the wax blend.

18. The wax blend of claim 15, wherein the plurality of wax grades comprises 15 to 40 percent by weight of the wax blend.

19. The wax blend of claim 17, wherein the at least one resinous material comprises a first C5 hydrocarbon and a second C5 hydrocarbon.

20. The wax blend of claim 16, wherein the at least one micro-wax comprises a first micro-wax and a second micro-wax.

21. A method of investment casting, comprising
utilizing the blended wax according to claim 1 to form a wax pattern,
investing the wax pattern with a medium to form a mold, and
removing the wax pattern from the mold.

22. A method of investment casting, comprising
utilizing the wax blend according to claim 9 to form a wax pattern,
investing the wax pattern with a medium to form a mold, and
removing the wax pattern from the mold.

23. A method of investment casting, comprising
utilizing the blended wax according to claim 15 to form a wax pattern,
investing the wax pattern with a medium to form a mold, and
removing the wax pattern from the mold.

* * * * *